MAGNETIC MEMORY ARRANGEMENT

Filed Aug. 25, 1960

INVENTOR
SVEN ARNE OLSSON

BY Hane and Nydick
ATTORNEYS

United States Patent Office 3,222,656
Patented Dec. 7, 1965

3,222,656

MAGNETIC MEMORY ARRANGEMENT

Sven Arne Olsson, Ekholmen, Alvsjo, Sweden, assignor to Telefonaktiebolaget L M Ericsson, Stockholm, Sweden, a corporation of Sweden Filed Aug. 25, 1960, Ser. No. 51,911
Claims priority, application Sweden, Sept. 16, 1959, 8,609/59
1 Claim. (Cl. 340—174)

Figures 1, 2, 3, 4, 5, 6:
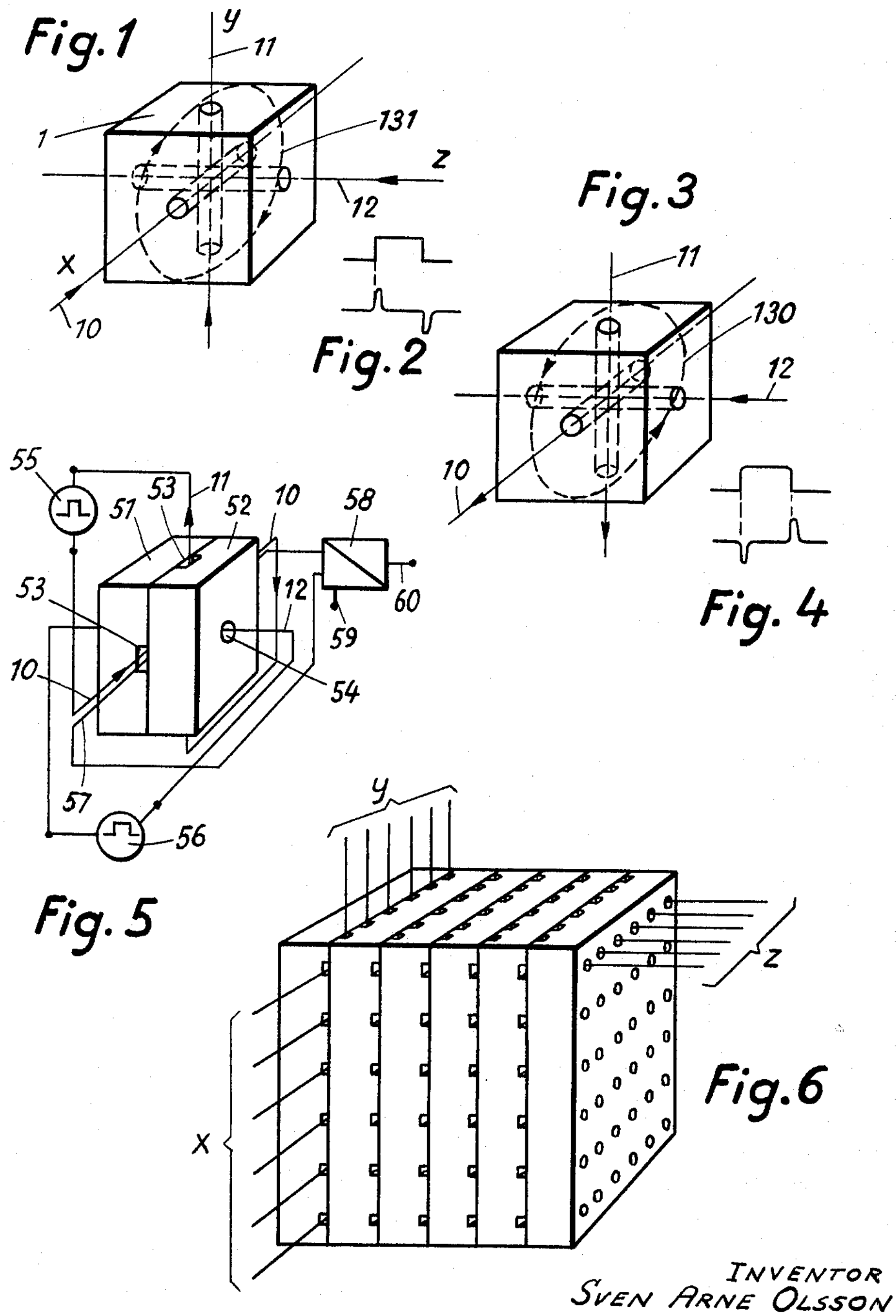

The present invention relates to a magnetic memory arrangement consisting of on one hand a body of material, which includes a rectangular hysteresis loop at least in some part thereof, on the other hand a conductor network placed in said body for feeding binary information and for reading the information fed in this way.

The purpose of the invention is to supply a simple and stable arrangement, which contrary to many similar magnetic memory arrangements makes it possible to read without simultaneous erasure of the fed information. A magnetic memory arrangement formed according to the invention is characterized thereby that the mentioned body is built up of a number of units, each one of which is formed with three crossing holes substantially at right angles with one another for conductors, which conductors in two crossing holes of said three holes are connected to current sources and are used for feeding binary information to the unit by coincident feeding magnetizing currents to said conductors and in the third hole crossing said two holes one conductor is connected to an impulse source and is used for feeding a reading impulse to the unit, and at which a reading conductor in one of said two holes is connected to an indicating arrangement for indication of the fed binary information.

The invention will be further described in connection to the attached drawing, where FIG. 1 schematically shows a unit with introduced current-flow directions in a memory arrangement according to the invention, FIG. 2 shows a pulse diagram for the unit according to FIG. 1, FIG. 3 shows the unit according to FIG. 1 with current-flow directions changed, FIG. 4 shows a pulse diagram for the unit according to FIG. 3, FIG. 5 shows a modification of the unit according to FIG. 1 and FIG. 3, and FIG. 6 finally shows a memory arrangement built up by several units according to FIG. 5.

The unit or the memory element 1 according to FIG. 1 consists of a cube of ferrite material with rectangular hysteresis loop. Crossing holes are drilled through this cube in the $x$-, $y$- and $z$-directions, so that passages are formed substantially perpendicular to each other and meet at the same point of the body, through which holes conductors 10, 11 and 12 respectively are drawn. The conductors 10 and 11 are connected, respectively, to a current source (not shown in FIG. 1), and the feeding of binary information to the unit takes place by coincident feeding of magnetizing currents through said two conductors. As these currents have the directions shown in FIG. 1 a resulting flow vector with such an orientation as indicated by the dotted curve line 131 is received. As to definition this orientation can be said to represent the binary information "1." The reading of the memory element occurs by feeding a positive pulse through the conductor 12, see FIG. 2. This pulse does not cause erasing of the fed information but certainly a rotation of the plane of the flow vector, and this rotation can be indicated via a reading conductor through the hole in the $x$- or $y$-direction in an indicating arrangement, e.g. as a positive voltage step. As appears from FIG. 2 the front flank of the positive reading pulse gives rise to a positive step and its back flank to a negative step. By suitable steering of the indicating arrangement this can be brought to react for, for instance, the front flank only, and in that way a positive voltage step in the indicating arrangement marks the binary information "1."

If the direction of the magnetizing currents through the conductors 10 and 11 is changed, see FIG. 3, the direction of the resulting flow vector is also changed (in FIG. 3 symbolized 130), and the thereby arisen orientation represents then the binary information "0." A positive reading pulse through the conductor 12 gives in this case a negative step for the front flank and a positive step for the back flank, see FIG. 4, and in analogy with the foregoing a negative voltage step in the indicating arrangement will consequently mark the binary information "0."

A condition for the stated reading method is of course that the amplitude (on the conductor 12) of the reading pulse is not so large that the knee of the hysteresis loop is overstepped for the material in question.

The unit according to FIG. 5 is composed of two equal parts 51 and 52, which have each its rectangular groove 53 along a plane surface and a center hole 54 perpendicular to said groove. The parts are placed with the grooves towards each other but so that the grooves cut each other at 90°. Hereby a unit is obtained in principle of the same kind as in FIG. 1, which is extremely simple for instance as regards the necessary drawing of wires. A pulse source 55 is connected in series with the conductor 10 and the conductor 11 and is meant for coincident feeding magnetizing current to these conductors. Duration and amplitude of the pulses fed from the source 55 can be e.g. 10$\mu$ and 500 ma. respectively. Through the same groove as the conductor 10 is drawn a reading conductor 57, which is connected to a combined amplifier and a relaxation circuit 58. The writing of the binary information "1" occurs by feeding magnetizing current through the conductors 10 and 11 in the direction stated by points and a following reading occurs by feeding a reading pulse to the conductor 12. At this a positive voltage pulse is obtained in the reading conductor 57, which voltage pulse actuates the relaxation circuit 58, which has been earlier set to zero by applying a potential to a conductor 59. On the output 60 of this the binary information appears as a voltage rise or voltage drop.

As appears from FIG. 6 a matrix can be built up in a simple way of units of the earlier mentioned kind. Several parts 51 form together a plate, which for instance after grinding by sintering is pressed together with a similar plate consisting of several elements 52. In this way a mechanical block of memory units can be manufactured, which is very stable and requires little space, which block also has the advantage that the drawing of wires is very simple. Instead of round wires the drawing of wires can of course be made by copper plating of the holes.

Besides the advantage that the reading is not erasing it can also be mentioned that the reading can be done with very high frequency, which is of great importance with regard to the more and more increasing speed of function at electronic components.

It is evident that the whole arrangement shown for instance in FIG. 6 must not necessarily be composed of material, which has a rectangular hysteresis loop; the principal thing is that the case is so in the immediate nearness of the space where the three holes in every unit cut each other.

I claim:

A magnetic memory device comprising a member at least part of which is made of a magnetic material having a substantially rectangular hysteresis loop and having three substantially mutually perpendicular passages in said magnetic material, said passages intersecting within said member at the same point, a first conductor extending through a first one of said passages, a second conductor extending through a second passage, said first and second conductors being serially connected to a common pulse current supply source to have them coincidentally fed with current pulses representing binary information, a third conductor extending through a third passage and connected to a pulse current supply source for feeding a reading pulse to the device, and a fourth conductor extending through one of said first and second passages and connected to an indicating device for indicating the stored binary information.

References Cited by the Examiner

UNITED STATES PATENTS

| | | | |
|---|---|---|---|
| 2,952,840 | 9/1960 | Ridler et al. | 340—174 |
| 2,961,745 | 11/1960 | Smith | 340—174 |
| 2,979,701 | 4/1961 | Marchand | 340—174 |
| 2,985,768 | 5/1961 | Bobeck | 340—174 |
| 3,060,410 | 10/1962 | Wanlass | 340—174 |
| 3,134,964 | 5/1964 | Wanlass | 340—174 |

OTHER REFERENCES

Pages 822–830: January 1954—Publication I, "Nondestructive Sensing of Magnetic Cores," by Buck & Frank, Communications and Electronics.

Pages 40–54: Aug. 31, 1959—Publication II, "Biax High Speed Magnetic Computer Element," by Wanlass and Wanlass, IRE-Wescon Convention Record, vol. 3, part 4.

IRVING L. SRAGOW, *Primary Examiner.*

JOHN F. BURNS, *Examiner.*